(12) United States Patent
King et al.

(10) Patent No.: US 7,996,548 B2
(45) Date of Patent: Aug. 9, 2011

(54) MESSAGE COMMUNICATION TECHNIQUES

(75) Inventors: Steven King, Portland, OR (US); Ram Huggahalli, Phoenix, AZ (US); Xia Zhu, Hillsboro, OR (US); Mazhar Memon, Austin, TX (US); Frank Berry, North Plains, OR (US); Nitin Bhardwaj, Hillsboro, OR (US); Amit Kumar, Hillsboro, OR (US); Theodore Willke, II, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 12/319,099

(22) Filed: Dec. 30, 2008

(65) Prior Publication Data

US 2010/0169501 A1   Jul. 1, 2010

(51) Int. Cl.
*G06F 15/16* (2006.01)

(52) U.S. Cl. .......... 709/230; 709/200; 710/315; 710/52; 711/120

(58) Field of Classification Search .............. 709/230, 709/200; 710/315, 52; 711/120
See application file for complete search history.

(56) References Cited

U.S. PATENT DOCUMENTS

| | | | | |
|---|---|---|---|---|
| 6,219,728 B1 * | 4/2001 | Yin | .................. | 710/52 |
| 6,332,180 B1 * | 12/2001 | Kauffman et al. | ............. | 711/153 |
| 6,490,280 B1 * | 12/2002 | Leung | ............................ | 370/392 |
| 6,789,156 B1 * | 9/2004 | Waldspurger | ..................... | 711/6 |
| 7,212,528 B2 * | 5/2007 | Kuhl et al | ..................... | 370/389 |
| 7,254,112 B2 * | 8/2007 | Cornet et al. | ................. | 370/230 |
| 7,437,511 B1 * | 10/2008 | Nguyen et al. | ................. | 711/120 |
| 7,490,324 B2 * | 2/2009 | Shultz et al. | ....................... | 718/1 |
| 7,724,740 B1 * | 5/2010 | Wang et al. | .................... | 370/392 |
| 2004/0042395 A1 | 3/2004 | Lu et al. | | |
| 2004/0267948 A1 * | 12/2004 | Oliver et al. | ................... | 709/230 |
| 2005/0132210 A1 | 6/2005 | Yunus et al. | | |
| 2007/0168525 A1 * | 7/2007 | DeLeon et al. | ............... | 709/228 |
| 2007/0168580 A1 | 7/2007 | Schumacher | | |
| 2008/0059686 A1 * | 3/2008 | Wilkinson | ..................... | 710/315 |
| 2008/0080491 A1 * | 4/2008 | Saripalli | ........................ | 370/378 |
| 2009/0097495 A1 * | 4/2009 | Palacharla et al. | ............ | 370/413 |

(Continued)

FOREIGN PATENT DOCUMENTS

WO    2010/078010 A2    7/2010

(Continued)

OTHER PUBLICATIONS

Bush, Stephen F., "Active Virtual Network Management Protocol", General Electric Corporate Research and Development, Niskayuna, NY, 1999, 11 Pages.

(Continued)

*Primary Examiner* — John Follansbee
*Assistant Examiner* — Anthony Mejia
(74) *Attorney, Agent, or Firm* — Glen B Choi

(57) ABSTRACT

A network protocol unit interface is described that uses a message engine to transfer contents of received network protocol units in message segments to a destination message engine. The network protocol unit interface uses a message engine to receive messages whose content is to be transmitted in network protocol units. A message engine transmits message segments to a destination message engine without the message engine transmitter and receiver sharing memory space. In addition, the transmitter message engine can transmit message segments to a receiver message engine by use of a virtual address associated with the receiver message and a queue identifier, as opposed to a memory address.

20 Claims, 9 Drawing Sheets

U.S. PATENT DOCUMENTS

| | | | |
|---|---|---|---|
| 2010/0070677 A1* | 3/2010 | Thakkar | 711/6 |
| 2010/0131636 A1* | 5/2010 | Suri et al. | 709/224 |
| 2010/0169528 A1 | 7/2010 | Kumar et al. | |

FOREIGN PATENT DOCUMENTS

| | | | |
|---|---|---|---|
| WO | 2010/078017 | A2 | 7/2010 |
| WO | 2010/078017 | A3 | 8/2010 |
| WO | 2010/078010 | A3 | 9/2010 |

OTHER PUBLICATIONS

Mattern, Friedemann, "Efficient Algorithms for Distributed Snapshots and Global Virtual Time Approximation", Journal of Parallel and Distributed Computing, 1993, vol. 18, No. 4, Germany, pp. 1-20.

International Search Report and Written Opinion for PCT Patent Application No. PCT/US2009/068396, mailed on Jul. 28, 2010, 9 Pages.

International Search Report and Written Opinion for PCT Patent Application No. PCT/US2009/068425, mailed on Jun. 29, 2010, 11 pages.

Bush, Stephen F., "Active Virtual Network Management Prediction", In Parallel and Discrete Event Simulation Conference (PADS) 1999, 13 Pages.

Romanow, Allyn et al., "An Overview of RDMA over IP", In First International Workshop on Protocols for Fast Long-Distance Networks, 2003, pp. 1-22.

Shah, Hemal et al., "Direct Data Placement over Reliable Transports (Version 1.0)", draft-shah-iwarp-ddp-v1.0, Oct. 21, 2002, pp. 1-35.

* cited by examiner

| 0 | 7 | 8 | 31 |
|---|---|---|---|
| Version | | Reserved | |
| ASID ||||
| CR3<br>(64-bits) ||||
| Queue Table Address<br>(64-bits) ||||

FIG. 6

| 0 | 7 | 8 9 10 11 | 31 |
|---|---|---|---|
| 0 | | | Reserved |
| Reserved<br>(5 x 32-bits) ||||

FIG. 7

| 0 | 7 | 8 9 10 11 | 31 |
|---|---|---|---|
| 1 | | | Reserved |
| VME Address ||||
| Queue Number ||||
| Size ||||
| Address<br>(64-bits) ||||

FIG. 8

| 0 | 7 8 | | 31 |
|---|---|---|---|
| 1 | Reserved | | |
| Destination VME Address ||||
| Source VME Address ||||
| QN ||||
| MSN ||||
| RID ||||

FIG. 11

| 0 | 7 8 | 22 24 | 31 |
|---|---|---|---|
| 2 | Reserved || |
| Destination VME Address ||||
| Source VME Address ||||
| RT ||| 0 |
| RID ||||

FIG. 12

MESSAGE COMMUNICATION TECHNIQUES

CROSS-REFERENCE TO RELATED APPLICATION

The present application is related to co-pending U.S. patent application Ser. No. 12/319,033, filed Dec. 30, 2008, entitled "Interrupt Techniques," inventors Kumar et al.

FIELD

The subject matter disclosed herein relates generally to techniques for transmitting data.

RELATED ART

In data networking, some data transfers occur by identifying a memory location of data and allowing a recipient to access the data from the memory location. One example is a soft-switch virtual machine delivering Ethernet packets to guest virtual machines (VMs) in a virtualized platform. The soft switch and guest VM can use page flipping, double copy through a shared staging buffer, or a hypervisor copy to transfer the packet. Another example is the iWARP specification described in Jeff Hilland, RDMA protocol verbs specification (version 1.0) (2003).

Each of these alternatives carries high processing cost out of proportion to the simple goal of moving data. In addition, sharing memory space can create issues. When a memory space is corrupted, each software or hardware that accesses the memory space may malfunction. In addition, as the number of cores in a central processing unit (CPU) grows, the likelihood that efficient intervening memory exists decreases. For example, a shared cache between sender and receiver may not exist, forcing interaction in DRAM.

As another example, consider a traditional data copy of a buffer from a sender to a receiver. If the sender performs the copy, the destination buffer becomes pure cache pollution in the sender's data caches. If the receiver copies, the source buffer becomes pure cache pollution in the receiver's data caches. Such misuse of cache is difficult or impossible to eliminate in today's CPU architectures. In some cases, it is desirable to permit transfer of data without sharing memory space.

BRIEF DESCRIPTION OF THE DRAWINGS

Embodiments of the present invention are illustrated by way of example, and not by way of limitation, in the drawings and in which like reference numerals refer to similar elements.

FIG. 6 depicts an example format for a context to define an available VMRE in accordance with an embodiment.

FIG. 7 depicts an example format for a no-operation command in a send queue in accordance with an embodiment.

FIG. 8 depicts an example format for a command in a send queue in accordance with an embodiment.

FIG. 11 depicts an example request to send (RTS) message format in accordance with an embodiment.

FIG. 12 depicts an example clear to send (CTS) message format in accordance with an embodiment.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
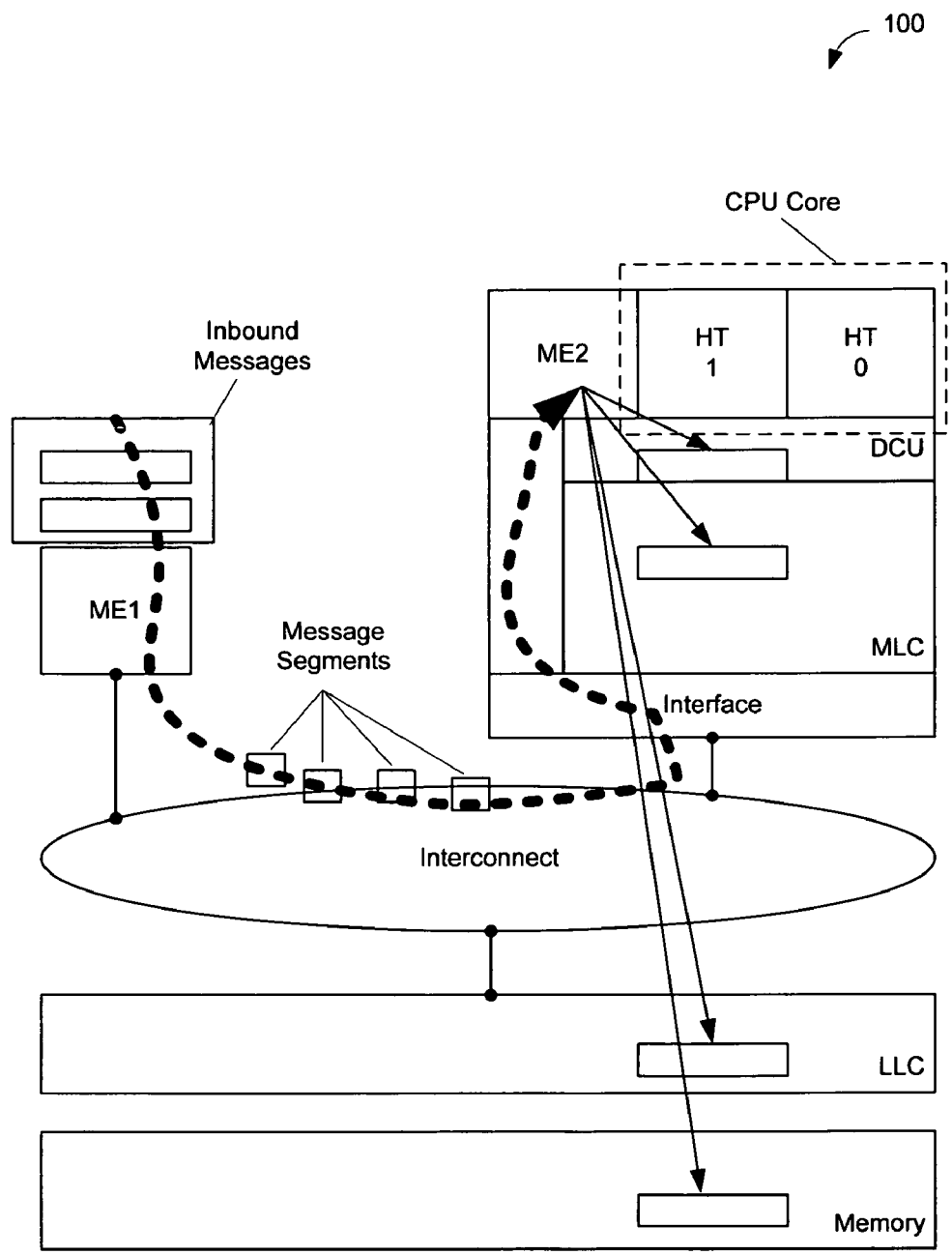
FIG. 1 depicts a system in accordance with an embodiment.

FIG. 1 depicts a high level overview of a system that uses Message Engines (ME) in accordance with an embodiment. Other more detailed aspects of message engine capabilities are described with regard to other figures. In this example, a first message engine, ME1, is capable of transmitting messages to a second message engine ME2 using an interconnect and without ME1 and ME2 using the same memory space. In some embodiments, a "message" encapsulates any type of data, but may not contain memory addresses for source memory buffers of the data and may not identify destination memory addresses for the data. In one embodiment, ME1 may have knowledge of a virtual message engine address (VMEA) of ME2 but not know the destination memory address of a memory buffer used by ME2 to store data transmitted by ME1. In addition, ME2 may know the VMEA of ME1, but not know a memory address from which data is transmitted using ME1. As will be described later, a VMEA may identify a particular message engine. A VMEA may be distinct from a memory address.

A benefit of not sharing memory space is that memory isolation for different applications can be maintained. A benefit of memory isolation is that failure or corruption of a memory space only affects the application that uses that memory space and no other applications. Another benefit of memory isolation is elimination of hardware and software overhead used to permanently or temporarily create shared memory between the memory spaces, or to transfer ownership of pages of memory between the memory spaces, or to transition to higher software privilege levels needed to copy data directly between the memory spaces.

In an embodiment, message engines may not maintain coherency of memory. Coherency is a protocol that ensures that multiple accessors of memory read the same data using the same address. Accordingly, by not maintaining coherency of memory, different message engines do not incur the overhead of the coherency protocol. Individual message engines may operate in distinct coherency domains. Coherency may be maintained at each endpoint. For example, coherency may be maintained between a thread and a message engine.

In an embodiment, message engines do not share the same physical memory. For example, message engines may not be permitted to access the same RAM chip.

A Virtual Message Engine (VME) is an instance of a virtualized interface to a Host Physical Message Engine (HPME). A VME supports sending and receiving of messages from virtual memory. Message Engines may also support RDMA Write and RDMA Read operations. A VME is either a Virtual Message Transmit Engine (VMTE) or Virtual Message Receive Engine (VMRE). A hypervisor or other privileged system entity (e.g., kernels in a native OS) may schedule one VMTE at a time, but multiple VMREs simultaneously on a single HPME. The hypervisor or other privileged entity may be a software routine executed by a processor.

Two virtual machines may make forward progress in their communication so long as a VMRE is able to receive when a VMTE transmits. The hypervisor may schedule the VMTE in a fine grain manner, such as by co-scheduling it with an associated software thread. The VMTE may discontinue transmitting when not scheduled by the hypervisor. The HPME may support multiple VMREs simultaneously. The VMRE may be scheduled independently from the CPU threads associated with a VMTE or a VMRE. The persistence of the VMRE may help with forward progress across scheduling quanta.

In some embodiments, a VMRE or VMTE may use processor virtual addresses for receiving and sending messages. These virtual addresses may use the same memory translation mechanism as software threads. The use of virtual addresses for messaging assists with address space isolation without the overhead of a separate memory control mechanism redundant to the existing software memory translation mechanism.

The hypervisor may build descriptors for VMEs (e.g., VMREs and VMTEs) with virtual addresses native to the address space in which the VME logically exists. A VME may logically exist in any virtual address space, for example: kernel mode of a native operating system (OS), kernel mode of a para-virtual non-VT guest OS, kernel mode of a fully virtual guest OS, user mode of a native OS, user mode of a para-virtual non-VT guest OS, user mode of a fully virtual guest OS, or a hypervisor. Virtual Message Engine Addresses (VMEA) may identify the VMTE or VMRE associated with a message.

In the example of FIG. 1, ME1 represents a Host Physical Message Engine (HPME). ME1 may be physically and logically associated with a source or sink of data, such as a computational element or input/output (IO or I/O) device (e.g., a network interface). ME1 may be incorporated into an IO device. A Virtual Message Transmit Engine (VMTE) associated with ME1 may use the VMEA of the destination VMRE to send messages to the destination VMRE. Accordingly, on transmit, ME1 maps a VMEA to an appropriate link over which segments flow and the segments arrive at the correct VMRE.

In this example, ME2 also represents an HPME. To receive segments, the ME2 uses a VMEA-to locate the VMRE of the incoming message segments from the set of all VMREs scheduled at ME2. ME2 is capable of receiving messages for processing by multiple hardware threads, HT0 and HT1. ME2 may be incorporated into a core with one or more hyperthreads. In this example, hyperthreads HT0 and HT1 are two hyperthreads that can process received messages. ME2 may be located outside the core or may be associated with more than one core. Message engines may exist outside of the CPU socket, for example in discrete IO devices, so long as the intervening physical and link-layer interconnect can transport messages appropriately.

ME2 may place received messages into various levels of the cache hierarchy or memory. For example, received messages can be stored in any of a data cache unit (DCU), mid level cache (MLC), last level cache (LLC) shared by all cores, or main memory (e.g., DRAM or SRAM). The DCU may be the fastest cache nearest to a software pipeline.

ME2 may be virtualized. As with a software thread, a Message Engine for a core may interact with system software via virtual addresses as defined by traditional memory management unit (MMU) page tables. Message engines may share virtual address space with one or more threads, though system software could construct a dedicated set of page tables for a message engine.

A Message Engine may subdivide a message into one or more message segments suitable for transport over a message interconnect. Message segments may have no associated memory address, may be un-ordered with respect to memory transactions, and travel out-of-band with respect to the cache hierarchy. An application or other software that is to process the received message segments may specify destination memory addresses in which the receiving message engine may store the message segments.

The interconnect may provide a transport medium for message segments from a sending message engine to a receiving message engine. The interconnect may share physical resources with a coherent memory interconnect, but provides a transport that is logically distinct and out-of-band with respect to coherent memory. Example interconnects include a ring, crossbar, and/or mesh. Interconnects may also include external buses such as PCI express.

Although not depicted, the system of FIG. 1 may also include the capability to access a storage device using a storage adapter. For example, the storage adapter may be capable of communicating with the storage in conformance with any of the following protocols: Small Computer Systems Interface (SCSI), Fibre Channel (FC), and/or Serial Advanced Technology Attachment (S-ATA). The storage may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Figure 2:
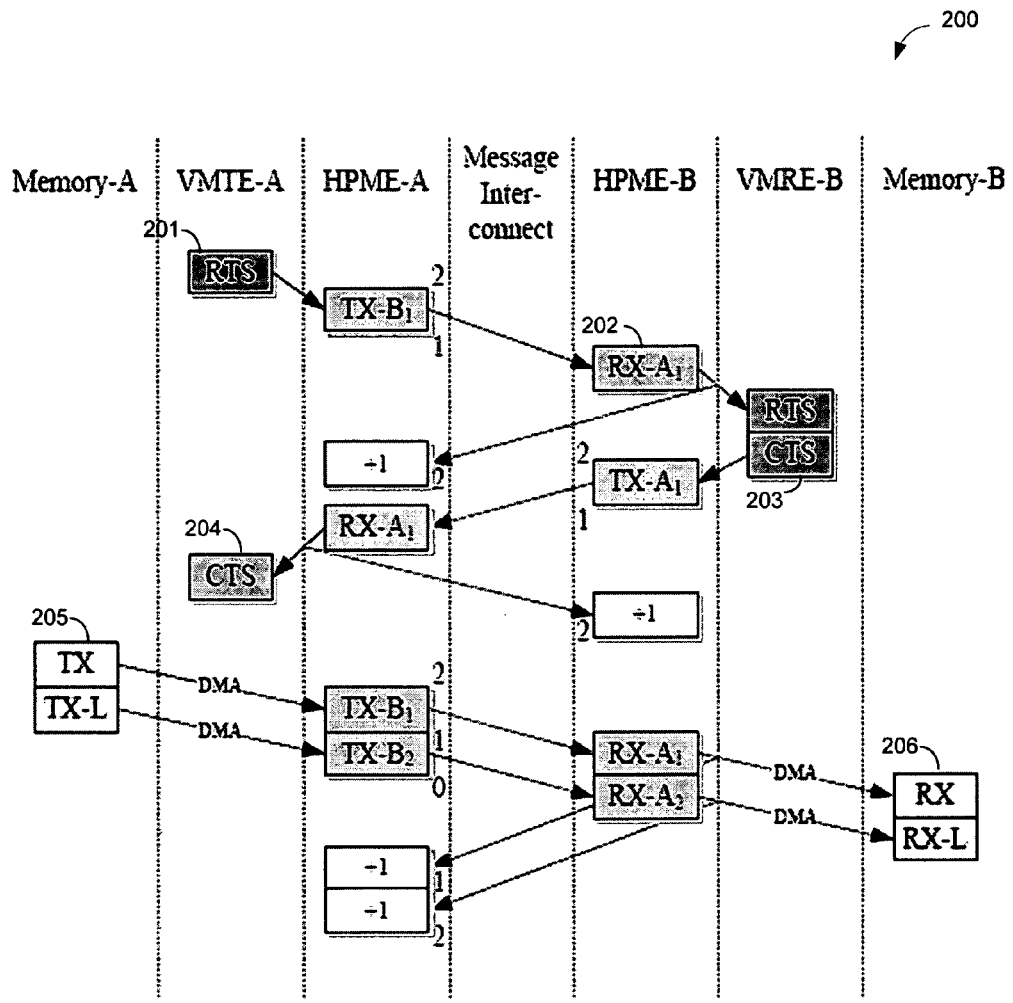
FIG. 2 depicts an example of communications between message engines in accordance with an embodiment.

FIG. 2 depicts an example of communications between message engines in accordance with an embodiment. A virtual message transmitter engine (VMTE-A) is associated with a host physical message engine HPME-A. A hypervisor (not depicted) is responsible for one-time establishment of a connection between sending and receiving message queues. Thereafter, unprivileged software in the address space of the VME may populate the queues with buffers. Once software creates a Send Queue Entry in a Send Queue (SQ), the VMTE may begin the transmit process described in an embodiment in FIG. 2.

At 201, VMTE-A initiates a transfer of message segments to a receiver message engine by transmitting a request to send (RTS) message to the VMRE. An RTS message may have the format described with regard to FIG. 11. In this example, the physical receiving message engine is HPME-B. A virtual receive message engine VMRE-B is associated with HPME-B.

HPME-A may use the following process to transmit an RTS message.

1. Allocate storage for a returning clear to send (CTS) message. This storage may be a portion of the memory occupied by the SQ entry for this message. The transmitter may associate the request ID (RID) value with this CTS storage in order to correctly process a returning CTS message.
2. Initialize the RTS message with the Destination and Source VME Addresses, queue number (QN), message sequence number (MSN), and request ID (RID).
3. Transmit the RTS message.

At 202, HPME-B may perform the following checks on the received messages: 1) the Destination VME Address belongs to a VMRE scheduled on the PME; 2) the QN exists and is less than or equal to the maximum permissible QN for the VMRE; 3) the Source VME Address is permitted to send to the specified QN at the destination VMRE address; 4) the MSN is greater than or equal to the minimum MSN value for the QN; and 5) the MSN is less than or equal the maximum MSN value for the QN. If all validation checks succeed, then HPME-B requests a reassembly slot used to reassemble received message segments.

The process to allocate a reassembly slot may be as follows.

1. Provide the Source VME Address, QN and MSN, RID values to a Reassembly Reservation Station (not depicted).
2. The Reassembly Reservation Station attempts to allocate a reassembly slot. If a slot is available, the Reassembly Reservation Station provides the Reassembly Tag and the RID to the CTS Transmit Handler (not depicted). The Reassembly Reservation Station may store pertinent local information such as the Source VME Address, QN and MSN values in a context associated with the Reassembly Tag.
3. A CTS Transmit Handler prepares the Segmentation and Reassembly Layer to handle inbound data segments associated with the RT.
4. The CTS Transmit Handler constructs and transmits the CTS message. The RID field contains the verbatim value received from the sender in the associated RTS message.

A Segmentation and Reassembly Layer (not depicted) of the sender of a CTS message may be ready to accept incoming data segments for the associated Reassembly Tag immediately upon transmitting the CTS message.

At 203, VMRE-B permits transmission of messages from VMTE-A by initiating transmission of a clear to send (CTS) message through a virtual message transmitter engine (not depicted) associated with HPME-B. The CTS message includes the Reassembly Tag (RT) value used by the VMRE to recognize this message from other in-flight messages.

VMRE-A (not depicted) is associated with HPME-A and is used to process received messages. At 204, VMRE-A (not depicted) recognizes the CTS message from HPME-B. The VMRE-A may use the RID value in the CTS message to identify the associated message.

At 205, VMRE-A marks the message as ready-to-send. If VMTE-A is currently scheduled, then VMTE-A begins transmission of the message depicted here as containing two segments called TX and TX-L from memory region A (memory-A) to memory region B (memory-B) using a data mover. A data receiver such as unprivileged software (not depicted), that is to process contents of the messages, populates a receive queue (RQ) with descriptors that point to buffers in memory. A reassembly layer reads the descriptors, the Reassembly Tag (RT) and Message Segment Offset (MSO) from message segments and informs a data mover to place the segments in a buffer designated memory-B. The descriptors, RT, and MSO identify a destination for segments as memory-B. The reassembly layer may inform VMRE-B when all segments of a message have been placed in memory.

VMTE-A transmits segments observing transmit priority with respect to other in-flight message transmit operations. If VMTE-A is not currently scheduled when VMRE-A marks the message ready-to-send, then transmission of the message may resume after the hypervisor reschedules VMTE-A.

At 206, message segments, TX and TX-L, arrive at memory region B. The message segments include the RT field used by VMRE-B to identify the message context to which the segments belong. This context may include the source and destination virtual message engine addresses, queue number (QN) field, and the message sequence number field (MSN).

The recipient PME locates the VMRE associated with the RT. If the PME cannot locate the receive context, the PME discards the segment. The recipient PME also validates that the MSO specified in the segment is within range for the message being received. If the MSO is not in range, the PME discards the segment.

The VMTE may transmit segments in order, but reordering of segments within a message may occur. At the message destination, a Reassembly Layer (not depicted) may: 1) place segments in memory; 2) may indicate message arrival to the VMRE only when all of the following conditions are met: a) all segments of a message have been placed in memory and b) all segments of all previous messages have been placed in memory; and 3) when indicating message arrival, the Reassembly Layer may indicate to the VMRE whether a message is a control messages or a data message.

The recipient of a message segment may ensure the segment is placed within the correct location in the message, regardless of arrival order. An MSO field in the message makes placement of a segment in the correct location a convenient operation in the VMRE. However, the recipient may ensure that all segments of a message have arrived before indicating that the message is available for processing.

The VMRE interface may make the following assertions.

1) After software posts a receive queue entry (RQE), but before a VMRE indicates a reconstructed message has arrived and is available for processing, the VMRE may manipulate memory within a message data buffer in any manner. Software may not depend on any particular data accessing behavior in the data buffer.

2) VMRE may manipulate memory within the RQE in any arbitrary manner. Software may not depend on any particular data accessing behavior in the RQE.

3) The VMRE may manipulate memory within the RQ Header to increment the head field by 1 or more.

4) After a VMRE indicates a message has arrived, software (e.g., software that processes the received message) can assume that all completed messages are placed in memory as indicated by the Head field of the RQ Header.

Figure 3:
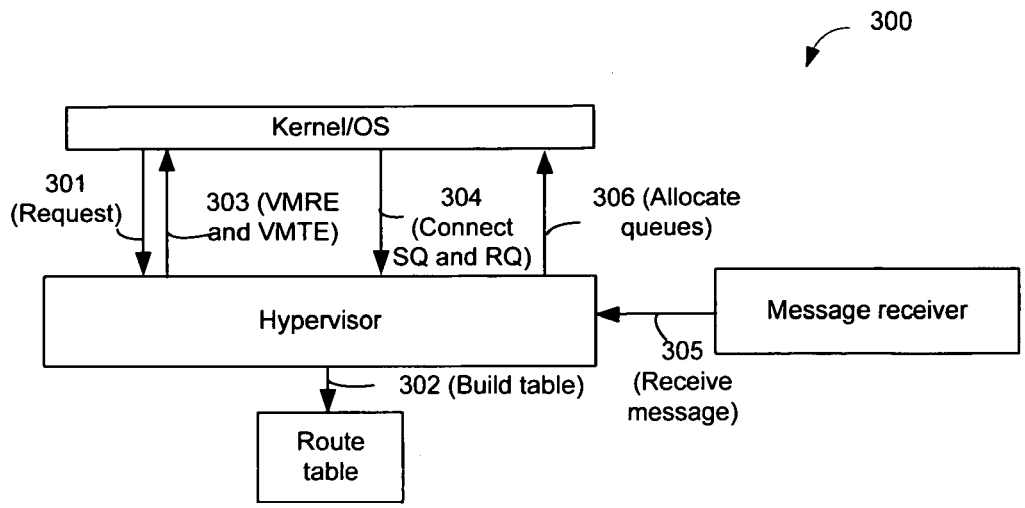
FIG. 3 depicts an example of initialization process for transmissions of message segments from a VMTE to a VMRE in accordance with an embodiment.

FIG. 3 depicts an example initialization process for transmissions of message segments from a VMTE to a VMRE in accordance with an embodiment. At 301, a kernel/operating system (OS) requests a hypervisor for a connection using message engines.

At 302, the hypervisor builds a table with contexts that describe available VMREs. Contexts are accessible by message engines. In some embodiments, suitable contexts are those described with regard to FIG. 6.

At 303, the hypervisor transfers to the kernel the logical addresses of the virtual message receive engine (VMRE) and virtual message transmit engine (VMTE) of a connection. The VMRE and VMTE correspond to addresses that serve as logical interfaces to physical message engines involved in the message engine connection.

At 304, the kernel requests the hypervisor to connect its send queue (SQ) to a remote receive queue (RQ).

At 305, a message receiver that controls receipt of messages indicates readiness to receive messages. The message receiver could be, but is not limited to, application software, kernel, soft-switch, or a fixed function accelerator.

At 306, the hypervisor allocates an SQ, RQ, and completion queue (CQ) and indicates the allocated SQ, RQ, and CQ to the kernel.

Thereafter, a physical transmitter message engine transfers contents of identified in part using the SQ to a location identified in part using the RQ. The RQ may exist in pageable memory. In one embodiment, the transmitting message engine uses a data mover to form message segments from contents of linear addresses, where the linear addresses are identified by the SQ. The transmitting message engine uses the data mover to place message segments into internal buffering pending transmission on the message interconnect. The receiving message engine uses a data mover to place message segments into linear addresses identified by the RQ. Linear addresses are contiguous addresses that are mapped in a CPU's page tables and these linear addresses may natively accessible by software.

A Completion Queue (CQ) allows a VME to notify software of activity, such as receiving or transmitting a message. A CQ may be associated with one or more SQs or one or more RQs. A CQ and its associated RQs or SQs may exist in the same address space as the VME. A CQ may reside in contiguous virtual address space. A CQ may exist in pageable memory and the VME may incur a page fault attempting to read or write the CQ.

Page faults may occur when a VME accesses the virtual buffers used to send and receive messages for a particular queue. A VMTE with a message to send will begin segmenting the message and providing those segments to the PME. The PME will transmit segments to the recipient throttled by link credit and in observation of transmit queue prioritization.

If the VMTE encounters a page fault while reading the message buffer, the VMTE takes the following actions: 1) pushes its current context into a Fault Context Buffer (not depicted) for this SQ; 2) halts transmission of messages from the faulting send queue; 3) interrupts the thread associated with the VME to resolve the fault; and 4) resumes processing all other Send Queues as normal.

For its part, the fault handier thread may take the following actions:

1. Read the fault context buffer and load the faulting page into memory.
2. Write the VME doorbell of the faulting SQ to resume message transmission.

Upon detecting the doorbell, the VME may take the following actions:

1. Continue processing higher priority SQs as normal.
2. After no higher priority SQs have a message to send, the VMTE loads the fault context buffer for the faulting SQ.
3. Resume segmenting the message starting with the first faulting segment.

A VMRE reassembles segments received from the PME by writing those segments to the corresponding message buffer in memory. If the VMRE encounters a page fault while writing a Receive Queue, the VMRE may take the following actions.

1. Push its current context into the Fault Context Buffer for this RQ.
2. Transmit the FAULT message to the sending VMTE. The FAULT message indicates the MSN of the faulting message segment.
3. Interrupt the thread associated with the VMRE to resolve the fault.
4. Discard any further message segments received for this message.
5. Continue to accept and place message segments for other queues (non-page faulting) as normal.

A fault-handler thread may take the following actions:

1. Read the Fault Context Buffer and faulting page into memory.
2. Construct a message to the sender to inform the sender to resume transmission of the faulting message. The contents of this message depend on the specific nature of the VMTE.

Figure 4A:
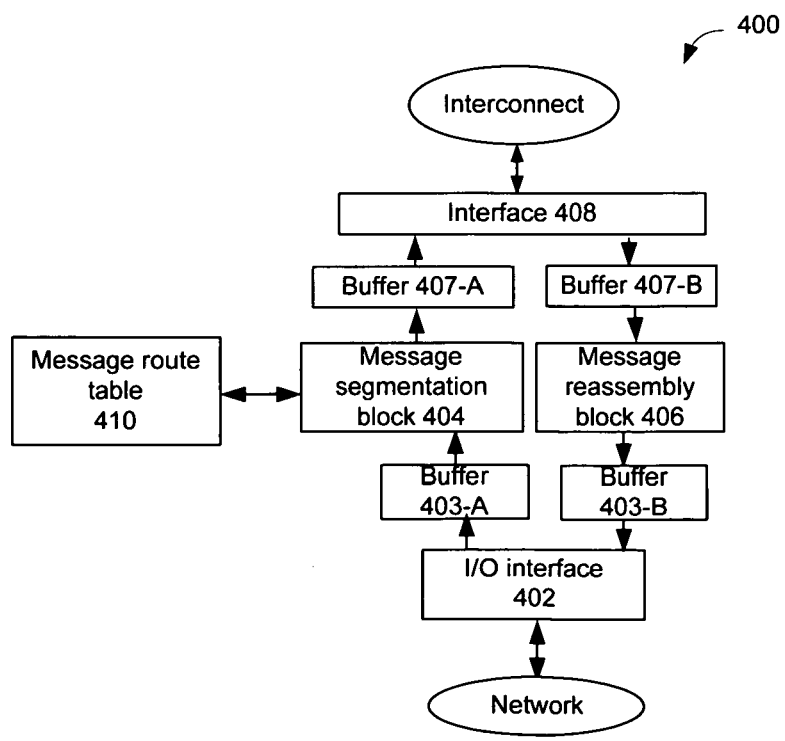
FIG. 4A depicts a simplified block diagram of a message engine in accordance with an embodiment.

FIG. 4A depicts a simplified block diagram of a message engine in accordance with an embodiment. For example, message engine 400 can be used to transmit messages to any other message engine, such as a may be contained within a network interface. Message engine 400 can also be used to receive messages from another message engine. The network interface may be capable of transmitting and receiving network protocol units. As used herein, a "network protocol unit" may include any packet or frame or other format of information with a header and payload portions formed in accordance with any protocol specification.

I/O interface 402 may perform media access control (MAC), filtering, and cyclic redundancy check (CRC) operations on received Ethernet frames as well as media access control for Ethernet frames to be transmitted. In other embodiments, I/O interface 402 may perform protocol encoding and decoding for frames and packets of other specifications.

Buffer 403-A may store received Ethernet frames processed by I/O interface 402 whereas buffer 403-B may store Ethernet frames that are to be transmitted prior to processing by I/O interface 402.

Message segmentation block 404 is capable of segmenting Ethernet frames from buffer 403-A into messages of a size compatible with an underlying message interconnect. Message segmentation block 404 may query message route table 410 to determine a Virtual Message Receive Engine (VMRE), queue number (QN), and message sequence number (MSN) in which to transfer messages that transport contents of a received Ethernet frame. Message segmentation block 404 may transfer message segments that are to be transmitted into buffer 407-A. Buffer 407-A may be identified using a send queue (SQ). Message segmentation block 404 may transfer message segments from buffer 407-A to the location associated with a VMRE, QN, and MSN using a data mover (not depicted).

Buffer 407-B may store message segments received through an interconnect. Buffer 407-B may be identified in part using a receive queue (RQ). Message reassembly block 406 may transfer message segments to buffer 407-B using a data mover (not depicted).

Message reassembly block 406 is capable of reassembling message segments in buffer 407-B into complete messages and providing the contents in buffer 403-B for transmission in one or more network protocol units.

Interface 408 may transfer messages from message segmentation block 404 to an interconnect and transfer messages from an interconnect to message reassembly block 406.

Figure 4B:
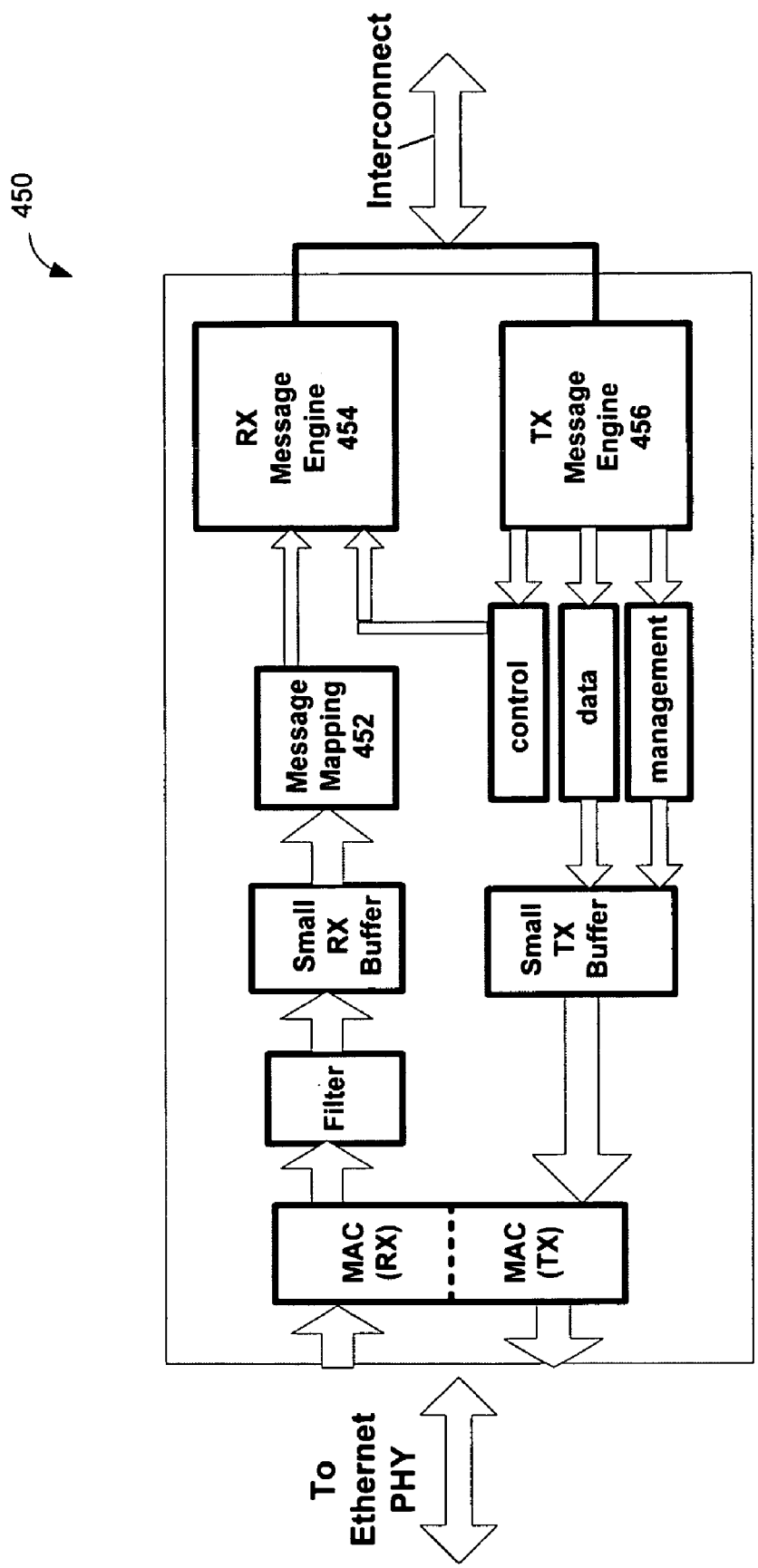
FIG. 4B depicts in block diagram format a network communication system that utilizes message engines to communicate with external devices in accordance with an embodiment.

FIG. 4B depicts in block diagram format a network communication system that utilizes message engines to communicate with external devices in accordance with an embodiment. For example, system 450 may include the capability of an Ethernet compatible network interface that transfers received Ethernet frames using receive (RX) message engine 454. System 450 also uses a transmit (TX) message engine 456 to receive messages that contain data to be transmitted in Ethernet frames or control or management information for the Ethernet network interface. System 450 may encode and decode other types of network protocol units such as but not limited to Serial ATA and Infiniband.

In this example, MAC RX block accepts Ethernet frames from the external Ethernet media PHY. MAC RX block performs framing and Ethernet CRC operations on the raw packets. Filter block discards packets that do not match filter rules. Small receive (RX) buffer block provides buffering to handle message interconnect jitter.

Message mapping block 452 determines an address of a destination message engine and queue for traffic from the small RX buffer. For example, message mapping block 452 may consider the source address, destination address, and/or payload of the Ethernet frame in identifying a destination message engine and queue for the traffic. The destination message engine and queue may be identified based on an identifier of a Virtual Message Receive Engine (VMRE), queue number (QN), and message sequence number (MSN). Multiple destination message engines may be available, where each destination message engine is associated with a core. Message mapping block 452 may distribute contents of Ethernet frames to cores using a distribution scheme similar to receive side scaling (RSS) or application targeting routing, although other schemes can be used. Message mapping block 452 may determine contents of message segment headers (e.g., non-data portion) using a lookup operation.

Receive (RX) message engine 454 may form message segments and transmit the messages using an interconnect to the destination message engine (not depicted). The destination message engine (not depicted) may receive messages for processing by a core, hardware accelerator, or network protocol offload processor (e.g., iSCSI).

Transmit (TX) message engine 456 may receive messages from a source message engine. TX message engine 456 may receive message segments from the on-die interconnect. TX message engine 456 may examine the payload of received messages to determine whether the messages contain control, data, or management content. TX message engine 456 directs control segments to the control block, management segments to the management block, and data segments to the data block.

Messages can be used to transmit control information in lieu of using memory based interaction (e.g., PCI). For example, control information in messages can be used to configure and direct runtime behavior. For example, a control message may set link speed.

The control block implements I/O Bridge control functionality, such as controlling the other functional blocks and the external Ethernet media PHY. The data block may form Ethernet data frames from message segments. Management block may form Ethernet control frames, e.g. PAUSE or other frames from message segments. The control block may exchange control messages with cores or devices elsewhere in the platform. For example, the control block may support control messages that allow configuration of the other blocks in the I/O Bridge.

Small transmit (TX) Buffer block provides buffering to handle message interconnect jitter. MAC transmit (TX) block performs framing and CRC operations-before transmitting the packet to an Ethernet media PHY.

In some embodiments, system 450 provides less dedicated silicon in the platform than a traditional discrete network interface. In some embodiment, system 450 provides a lean path between an Ethernet wire and a core and eliminates latency compared to a traditional network interface performing direct memory accesses (DMA). In some embodiments, software can implement OSI Layer 2 features instead of fixed silicon gates in a traditional network interface. In some embodiments, unlike a traditional network interface with DMA, system 450 does not require shared coherent memory with the cores that process the packets.

Figure 5:
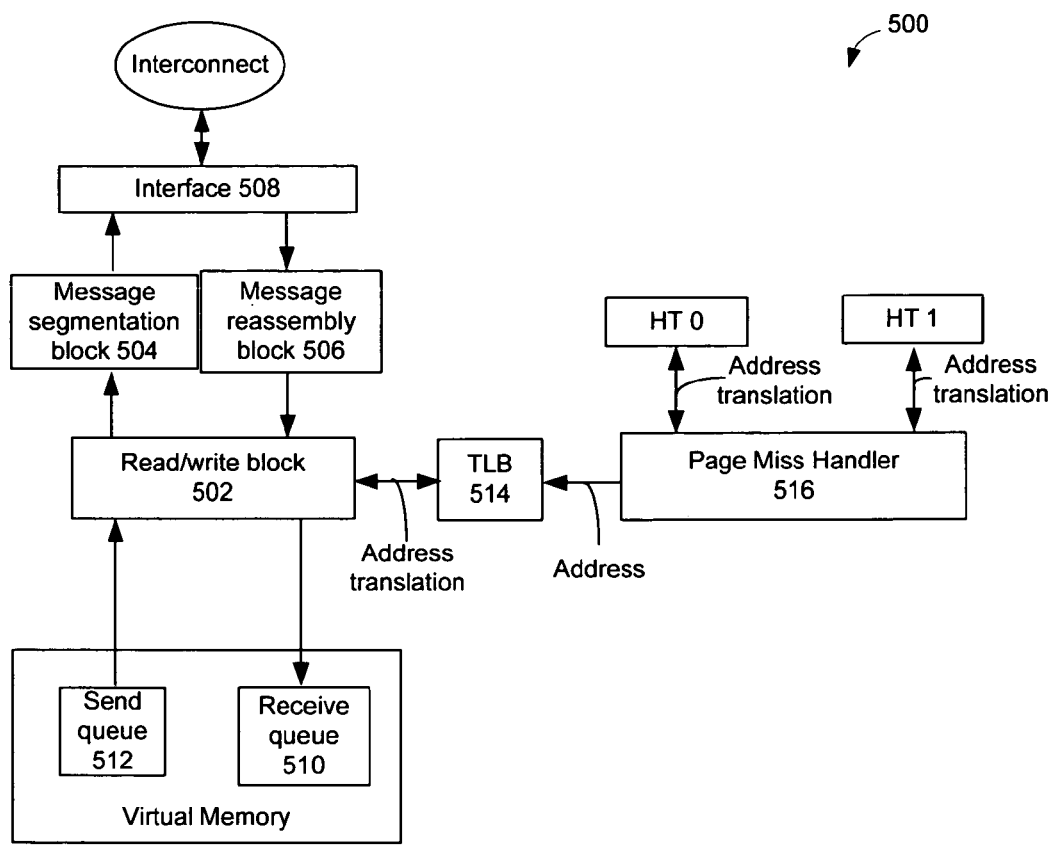
FIG. 5 depicts a high level block diagram of a message engine in accordance with an embodiment.

FIG. 5 depicts a high level block diagram of a message engine in accordance with an embodiment. Message engine 500 provides transmission of message segments at the request of a processor, core, or hardware thread as well as receipt of message segments for processing by a processor, core, or hardware thread.

For message transmission, message segmentation block 504 may segment messages identified using a send queue 512 for transmission through an interconnect. Although not depicted, message segmentation block 504 may use a data mover to transfer message segments identified using a send queue 512 to a location identified using a receive queue (not depicted). Accordingly, memory to memory transfers are made using contents of one local SQ and one local RQ and message engines may not interact directly with the queues of another message engine.

For message segments received from the interconnect, message reassembly block 506 may reassemble messages and store the messages into receive queue 510. Although not depicted, message reassembly block 506 may use a data mover to transfer message segments from a send queue associated with another message engine (both not depicted) into a location identified using receive queue 510.

Read/write block 502 permits reading of messages for transfer from a location identified using send queue 512 in virtual memory using virtual-to-physical address translation provided from Translation Lookaside Buffer (TLB) 514. Read/write block 502 permits writing of messages to a location identified using receive queue 510 in virtual memory using virtual-to-physical address translation provided from Translation Lookaside Buffer (TLB) 514. In one embodiment, read/write block 502 is capable of writing message segments to coherent memory and reading message segments from coherent memory in the same manner as hardware threads. Read/write block 502 may share a cache hierarchy and memory management unit (MMU) with hardware threads in a core.

Translation Lookaside Buffer (TLB) 514 and page miss handler (PMH) 516 provide memory management unit (MMU) capabilities. In response to virtual addresses provided by read/write block 502, TLB 514 converts virtual addresses to physical addresses. Hyperthread HT0 or HT1 may perform address translation of entries in PMH 516. If no entry is available in TLB 514, PMH 516 retrieves the addresses from a page table address and stores the addresses in TLB 514. The PMH 516 may be shared with hardware threads associated with a core. The PMH 516 may also be dedicated for use by one or more message engines.

Interface 508 may provide a physical layer interface between the interconnect and message segmentation block 504 and message reassembly block 506.

FIG. 6 depicts an example format for a context to define an available virtual message receive engine (VMRE) in accordance with an embodiment. Field Version (bits 7-0) indicates a version of the protocol. Field ASID specifies the Application Space Identifier used by the translation lookaside buffer (TLB) for virtual to physical address translations. Field CR3 specifies the page table address used by a page miss handler for virtual to physical address translations. Field Queue Table Address specifies the pageable memory address of the array of queues supported by this VMRE.

A Physical Message Engine (PME) provides virtualized interfaces to hardware threads using Virtual Message Engines (VMEs) at least to send and receive messages. The PME also provides a physical interface to hardware threads for the purpose of control and configuration of message engine hardware. The physical interface to the PME may not perform virtual memory translation. Rather, the physical interface of the PME may interact with pinned memory in host physical address space. The physical interface of the PME may also interact with registers in a core.

A Virtual Message Engine (VME) may perform memory translations using MMU page tables and interact with virtual memory. As with a software thread, a VME accesses memory in association with an ASID and CR3 pointer to the top of a page table structure. The VME may share ASID and CR3 values with the software threads associated with an address space, though this is not required. System software may treat the VME as a thread within the address space identified by the ASID. For example, system software may keep the page tables utilized by the VME in a consistent state so long as a VMTE or VMRE may send or receive a message. Standard TLB shoot-down rules may apply as with software threads.

FIG. 7 depicts an example format for a no-operation command in a send queue in accordance with an embodiment. A send queue (SQ) entry directs the VMTE to perform a null operation that does not send a message. Field Command (bits 7-0) is 0 for a No-op command. Field Immediate Interrupt (II), when set, directs the VME to generate a CQ interrupt immediately, regardless of the interrupt moderation interval.

FIG. 8 depicts an example format for a command in a send queue in accordance with an embodiment. This command commands a VMTE to transmit a message. Field Command (bits 7-0) is 1 for a Send command. Field Immediate Interrupt (II), when set, directs the VME to generate a CQ interrupt immediately, regardless of the interrupt moderation interval. Field VME Address specifies the destination VMRE for the message. Field Queue Number specifies the destination queue number for this message. Field size specifies the number of bytes in contiguous virtual memory to transmit. Field address specifies the virtual address in cacheable pageable memory of the data to transmit.

Figure 9:
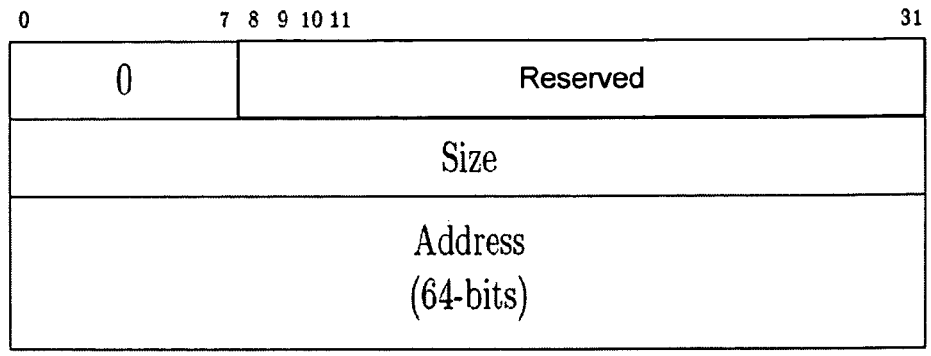
FIG. 9 depicts an example receive queue format in accordance with an embodiment.

FIG. 9 depicts an example entry in a receive queue in accordance with an embodiment. Field Command (bits 7-0) is 0 for a Receive command. Field Immediate Interrupt (II), when set, directs the VME to generate a CQ interrupt immediately, regardless of the interrupt moderation interval. Field Size specifies the number of bytes in contiguous virtual memory of the receive buffer. Upon completion of the message receive operation for this descriptor, the VMRE updates the Size field to contain the actual number of message segments received. Field Address specifies the virtual address in cacheable pageable memory of the receive buffer.

Figure 10:
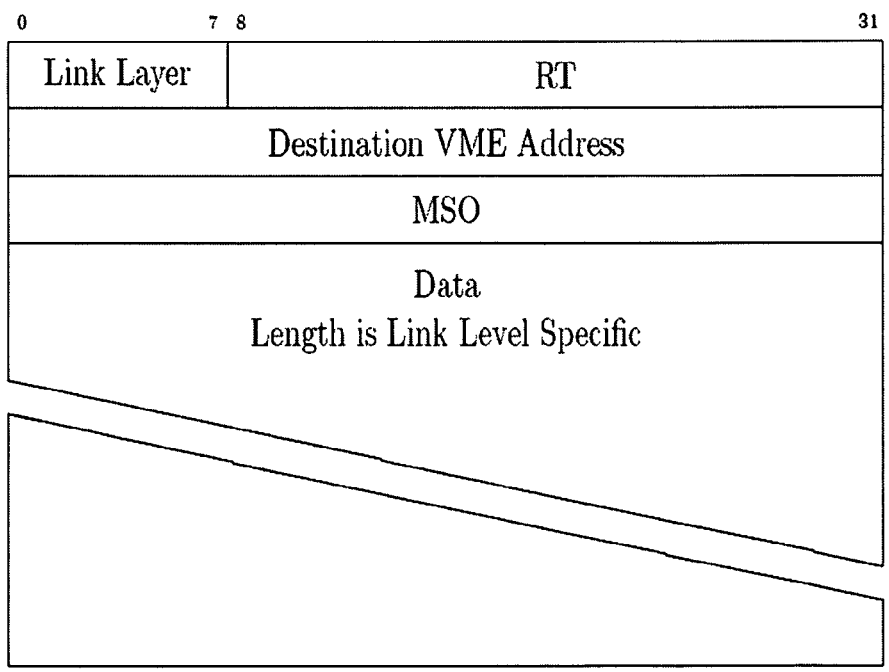
FIG. 10 depicts an example message segment format in accordance with an embodiment.

FIG. 10 depicts an example message segment format in accordance with an embodiment. Field RT specifies the Reassembly Tag returned in the CTS Messages. Field Destination VME Address specifies the destination VMRE for the segment. Field MSO specifies the Message Segment Offset of the segment. The MSO contains the position of this segment relative to the start of the message. The first segment of the entire message is numbered 0. The data portion of the segment contains the data payload of this segment. The length of the payload is Link Layer specific. Although not depicted, the message segment format may also include a last field to indicate that a segment is the last segment of a message.

FIG. 11 depicts an example request to send (RTS) message format in accordance with an embodiment. Field Command is set to 1 for the RTS Message. Field Destination VME Address specifies the destination VMRE for the message. Field Source VME Address specifies the source VMTE of the message. Field QN specifies the destination Queue Number within the specified Address Space Identifier. Field MSN specifies the Message Sequence Number within the specified Queue Number. Field RID specifies the Request ID that the recipient may return verbatim in the CTS Message associated with this request.

A maximum message size may be smaller than the jumbo frame size. In an embodiment, a single RTS message can be transmitted for several adjacent messages which belong to the same connection, where the adjacent messages are used to transmit a jumbo frame. A field for "Number of Message" could be added in the RTS message to identify the message number associated with a single RTS message and a jumbo frame. For example, part of the current Reserved field in FIG. 11 can include the Number of Message field. In addition, in FIG. 10, a small portion of the MSO field could be used to identify the Number of Message within one RTS or RT.

FIG. 12 depicts an example clear to send (CTS) message format in accordance with an embodiment. Command field may be set to 2 for the CTS Message. Field Destination VME Address specifies the destination VMRE for the message. Field Source VME Address specifies the source VMTE of the message. Field RT specifies the Reassembly Tag. For subsequent message segments, the VMTE places this value in the RT field of every segment of the message. The upper byte of the RT value is set to 0. RID field specifies the Request ID supplied by the VMTE in the RTS message. Field RID allows the VMTE to correlate CTS messages with outstanding RTS messages.

Figure 13A:
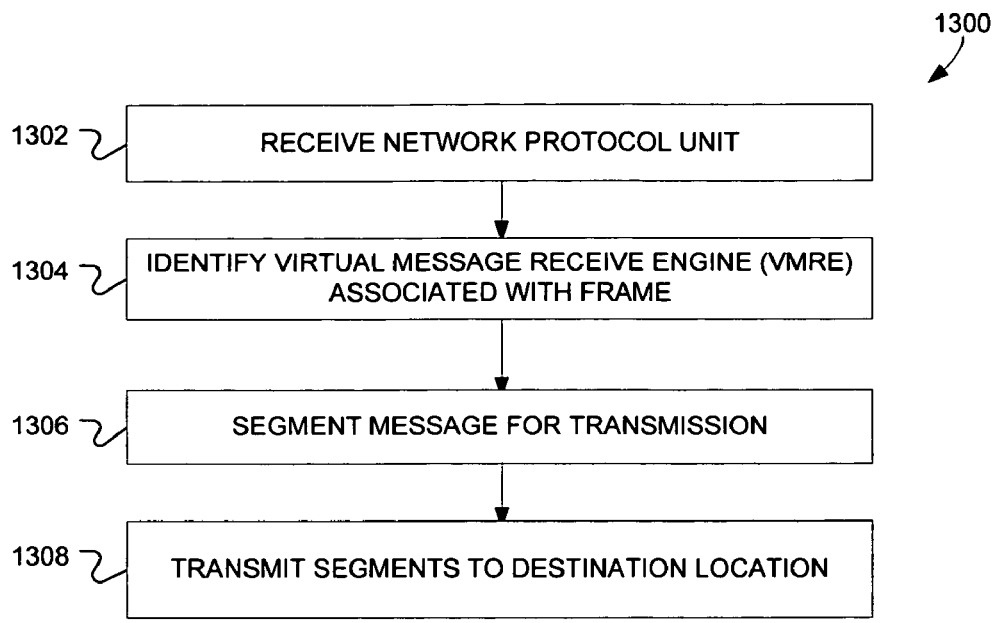
FIG. 13A depicts an example flow diagram of a process to transfer messages from an IO device using a message engine in accordance with an embodiment.

FIG. 13A depicts an example flow diagram of a process 1300 to transfer messages from an IO device using a message engine in accordance with an embodiment. Block 1302 may include receiving a network protocol unit from a network. For example, block 1302 may include receiving an Ethernet frame.

Block 1304 may include identifying a virtual message receive engine (VMRE) and destination queue associated with the received frame. The VMRE may be associated with a message engine that is to receive messages for processing by a core. The VMRE and destination queue (QN) may be identified as described with regard to FIG. 2.

Block 1306 may include segmenting a message for transmission to the VMRE. A virtual message transmit engine (VMTE) may segment the message. A format for message segments may be as described with regard to FIG. 10.

Block 1308 may include transmitting each segment to a destination location. The destination location in virtual memory may be identified by logic that is to process each received segment based in part on descriptors in a receive queue, the Reassembly Tag (RT) and Message Segment Offset (MSO) from the segments.

Figure 13B:
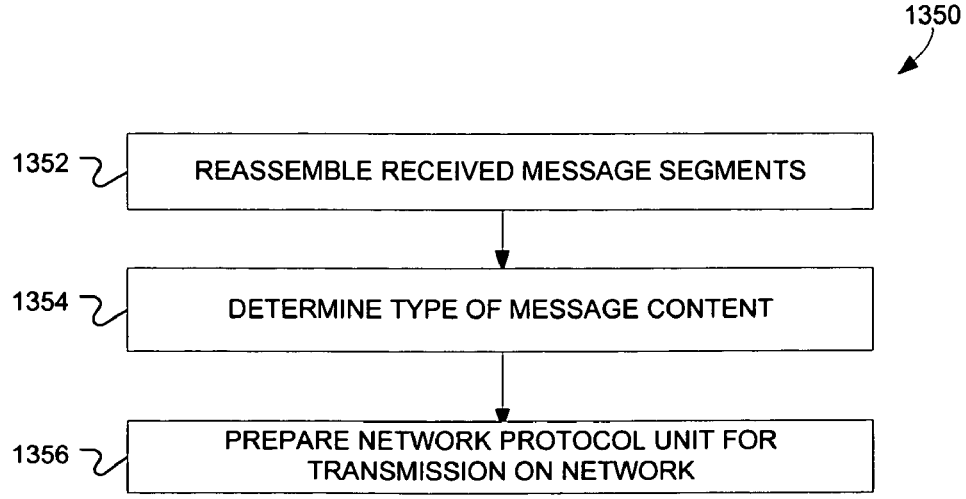
FIG. 13B depicts an example flow diagrams of a process to receive messages using a message engine at an IO device in accordance with an embodiment.

FIG. 13B depicts an example flow diagrams of a process 1350 to receive messages using a message engine at an IO device in accordance with an embodiment.

Block 1352 may include reassembling received message segments into complete messages. Messages may be received out of order. A Message Segment Offset (MSO) field in the message may be used to properly order the segments into a message.

Block 1354 may include determining the type of message content. For example, content can be control, data, or management.

Block 1356 may include preparing a network protocol unit with data or control content for transmission. For example, block 1356 may include preparing an Ethernet frame with data or control content for transmission.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
    determining a virtual message transmit engine to process a received network protocol unit, wherein the virtual message transmit engine is associated with a first host physical message engine;
    determining a virtual message receive engine associated with the virtual message transmit engine, wherein the virtual message receive engine is associated with a second host physical message engine;
    the virtual message transmit engine requesting transforming contents of the network protocol unit into one or more message segments;
    the virtual message transmit engine requesting the first host physical message engine to transmit a request to send message to the virtual message receive engine in response to a send entry in the send queue associated with the virtual message transmit engine;
    the virtual message transmit engine requesting the first host physical message engine to transmit the network protocol unit in response to a clear to send message; and
    the virtual message transmit engine requesting transmission of content of the received network protocol unit using the one or more message segments to a memory region associated with the virtual message receive engine, wherein the transmission of the one or more message segments comprises transmission of one or more message segments to the memory region by identifying a virtual message engine address of the virtual message receive engine and independent of identifying the destination memory address of the memory region.

2. The method of claim 1, wherein at least one of the one or more message segments comprises a reassembly tag field and message segment offset field and further comprising:
    identifying the memory region based on the reassembly tag field;
    identifying a buffer in the memory region based on the reassembly tag field; and
    identifying a location in the buffer to store at least one of the message segments based in part on the message segment offset field.

3. The method of claim 1, wherein at least one of the one or more message segments comprises:
    a link level address;
    an address of the virtual message receive engine;
    a reassembly tag field;
    a message segment offset field; and
    a data portion.

4. The method of claim 1, wherein the network protocol unit is Ethernet compliant.

5. The method of claim 1, further comprising:
    receiving one or more message segments;
    re-assembling one or more message segments into a message; and
    forming a second network protocol unit based on contents of the message.

6. The method of claim 5, wherein contents of the received one or more message segments comprise at least one of control, data, and management information.

7. The method of claim 5, wherein the first host physical message engine is associated with a core and the second host physical message engine is associated with another core.

8. An apparatus comprising:
    a processor;
    logic to receive a network protocol and to perform media access control, filtering, and buffering on the network protocol unit; and
    a physical message engine associated with a virtual message transmit engine, wherein
        the virtual message transmit engine is associated with a virtual message receive engine;
        the virtual message transmit engine is to request the physical message engine to transmit a request to send message to the virtual message receive engine in response to a send entry in a send queue associated with the virtual message transmit engine;
        the virtual message transmit engine is to request the physical message engine to transmit the network protocol unit in response to a clear to send message; and
        the physical message engine is to transmit content of the network protocol unit, using at least one segment, in response to a request from the virtual message transmit engine, to a memory region associated with the virtual message receive engine by identifying the virtual message receive engine and independent of specifying a physical memory address of the memory region.

9. The apparatus of claim 8, wherein the virtual message receive engine is allocated based on receive side scaling.

10. The apparatus of claim 8, wherein the virtual receive message engine is associated with a core and the virtual transmit message engine is associated with another core.

11. The apparatus of claim 8, wherein at least one segment comprises:
    a link layer;
    a destination virtual message engine address;

a reassembly tag field;
a message segment offset field; and
a data portion.

12. The apparatus of claim 11, wherein the memory region is based on the reassembly tag field and further comprising:
   a buffer in the memory region based on the reassembly tag field; and
   a location in the buffer to store at least one segment based in part on the message segment offset field.

13. The apparatus of claim 8, further comprising:
   logic to prepare network protocol units for transmission; and
   a second message engine to receive the at least one segment and to provide content of the received at least one segment to the logic to prepare network protocol units for transmission.

14. A system comprising:
   a storage device;
   a network interface to receive a network protocol unit;
   a first message engine; and
   a second message engine, wherein:
      the first message engine is associated with a virtual message transmit engine,
      the virtual message transmit engine is associated with a virtual message receive engine;
      the second message engine is associated with the virtual message receive engine;
      the virtual message transmit engine is to request the first message engine to transmit a request to send message to the virtual message receive engine in response to a send entry in a send queue associated with the virtual message transmit engine;
      the virtual message transmit engine is to request the first message engine to transmit content of the network protocol unit in response to a clear to send message; and
      the first message engine is to transmit content of the network protocol unit using at least one message to a memory region associated with the virtual receive message engine, in response to a request from the virtual message transmit engine, by identifying the virtual message receive engine and independent of specifying a physical memory address of the memory region.

15. The system of claim 14, wherein the first message engine and the second message engine do not maintain memory coherency.

16. The system of claim 14, wherein the first message engine and the second message engine do not access the same physical memory.

17. The system of claim 14, wherein the first message engine comprises:
   a message mapper to determine the destination virtual message receive engine associated with the network protocol unit; and
   logic to transmit content of the network protocol unit using at least one message to the memory region associated with the destination virtual message receive engine.

18. The system of claim 14, wherein at least one message comprises:
   a link layer;
   a destination virtual message engine address;
   a reassembly tag field;
   a message segment offset field; and
   a data portion.

19. The system of claim 18, wherein the memory region is based on the reassembly tag field and further comprising:
   a buffer in the memory region based on the reassembly tag field; and
   a location in the buffer to store the at least one message based in part on the message segment offset field.

20. The system of claim 14, wherein the first message engine is associated with a first core and the second message engine is associated with a second core.

* * * * *